May 30, 1961 M. EATON 2,986,623

TIP SHIELDED ELECTRODES FOR ELECTRIC BOILERS

Filed May 2, 1960

Inventor
M. EATON
By Heatley & Morrison
Agent

United States Patent Office 2,986,623
Patented May 30, 1961

2,986,623

TIP SHIELDED ELECTRODES FOR ELECTRIC BOILERS

Milton Eaton, Shawinigan, Quebec, Canada, assignor to The Shawinigan Water and Power Company, Montreal, Quebec, Canada, a corporation of Quebec Filed May 2, 1960, Ser. No. 26,108

7 Claims. (Cl. 219—40)

This invention relates to improvements in electrodes for electric boilers of the type having their electrodes designed for the use of water-spout action and normally partially submerged in the boiler water.

U.S. Patent 2,611,852 described an improvement in electric boilers of the imperforate electrode type whereby water is taken from the boiler and is pumped back through water-spouts located directly under, and pointing upwards towards, the tips of the electrodes; preferably the feed water supply is also directed into the water-spouts. The spouted water passes along the outside surface of the imperforate electrodes and out into the boiler water. This process is defined as water-spout action and boilers using it are known as water-spout boilers. The essential apparatus required for water-spout action, as originally developed, is shown in Figure 1 of U.S. Patent 2,611,852.

A principal advantage of water-spout action is that the spouted water prevents steam accumulation on the submerged surfaces of the electrodes. If an envelope of steam is allowed to enclose a submerged portion of an electrode the electric current makes arcing contact with the electrode through the steam, thus causing corrosion of the electrode metal. The electrode tip is the most vulnerable part of the electrode because it carries current through the full range of boiler load and at the maximum electrode current density.

It was found in practice that the spouted water directed towards the electrode tips, as shown in Figure 1 of the above noted patent, caused boiler water oscillations resulting in unstable operation. It became evident that for satisfactory operation the spouted water must to some extent be guided beyond the tips of the electrodes. This was first accomplished by the use of hollow electrodes having central holes in their tips and vertical slots around their sides. The spouted water was directed into the electrodes, through the holes in their tips, and out through their vertical slots. This development is described in U.S. Patent 2,676,240. Electrodes of this design proved to have a number of disadvantages which led to the development of grid-shielded electrodes, U.S. Patent 2,783,356.

Although grid-shielded electrodes usually perform their desired functions, it is found that under certain operating conditions they are responsible for voltage disturbances of sufficient magnitude to cause boiler insulator flashovers.

The principal object of the present invention is to provide an improved electrode for use in water-spout boilers whereby improved operation of such boilers is attained. This object is achieved by the invention, which comprises a cylindrical metal electrode having a tapered tip, the tip being surrounded by a metal shield at a distance to provide an annular space between tip and shield, the shield being mechanically and electrically connected to the tip; preferably by welded metal strips.

The invention can be ascertained from the following detailed description of preferred embodiments of it, reference being made to the accompanying drawings in which.

Figure 3:
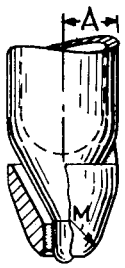
Figures 4, 5:
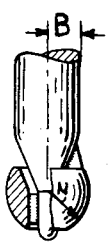

Figures 3, 4, and 5 are views showing modifications in design.

Figure 6:

Figure 6 is a plan view of a water-spout nozzle suitable for use with the electrode.

Figure 1:
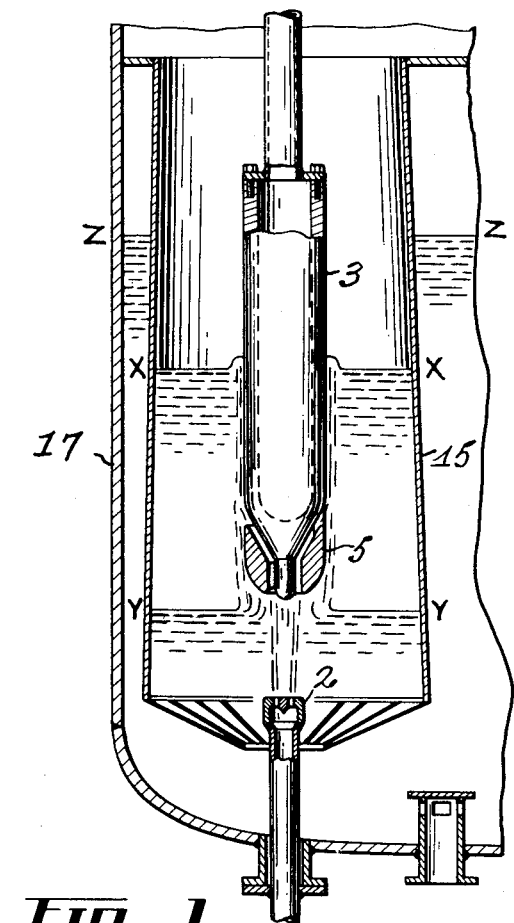
Figure 1 is a sectional view of part of a water-spout boiler with an electrode of this invention in place.
Figure 2:
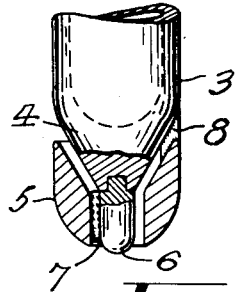
Figure 2 is an enlarged view showing parts of the electrodes in greater detail.

Sectional views of a typical embodiment of the invention are shown in Figures 1 and 2. It consists essentially of a cylindrical metal electrode 3, preferably made of carbon steel, with a tapered tip consisting of a conical portion 4, and a removable cylindrical portion with a rounded end 6. The tip is surrounded by a metal shield 5, preferably made of carbon steel, like the electrode. It is mechanically and electrically connected, preferably by welding, to the cylindrical portion by at least two radial metal strips 7 and to the conical portion by at least two radial metal strips 8, positioned so as to be accessible to a cutting torch. The radial width of the annular space between the shield 5 and the conical and cylindrical portions of the electrode 4 and 6 is preferably between one-half and one inch. The diameter of the cylindrical portion 6 and the circle diameter of the orifices in the water-spout nozzle 2 are preferably equal and between 15 and 30% of the electrode diameter.

In this embodiment of the invention the outer surface of the shield consists of a hemispherical lower end surmounted by a cylindrical portion, the radius of both being about equal to the radius of the electrode; the lower end of the shield having a central opening for the electrode tip and the annular space between the tip and the shield. The shield is preferably located so that the imaginary extension of its lower surface coincides with the lower end of the electrode tip. This shape is selected to provide, as nearly as possible, uniform current density on these parts.

The shape proposed in the preceding paragraph is most satisfactory for electrodes of diameters between seven and nine inches. Figure 3 shows a modification in design which is preferred for electrodes larger than nine inches. In this embodiment of the invention the radius M of the hemispherical end of the shield is between 50 and 90% of the radius A of the electrode and the shield is tapered from radius M out to radius A at its upper end as shown; the total height of the shield is roughly equal to the diameter of the electrode. Figure 4 shows a modification in design which may be used to advantage for electrodes having diameters less than seven inches particularly if they are to be used in boilers having an exceptionally high ratio of voltage to power. In this embodiment the radius N of the hemispherical end of the shield is between 10 and 50% greater than the radius B of the electrode and the shield is tapered from radius N in to radius B at its upper end as shown; the total height of the shield is roughly equal to the diameter of the electrode. Figure 5 shows a further modification in design which may be used to advantage in boilers having short electrode immersion even at full load water level. In this embodiment the cylindrical extension to the electrode tip 6 and radial vanes 7 of Figures 2 to 4 are omitted.

The cylindrical portion of the electrode and the shield are conveniently replaceable, since the tip is a separate removable part and the welded connections between the elements 8 and the electrode are readily accessible to a cutting torch. Alternatively, the removable portion may be made to screw into the recess in the lower extremity of electrode 3, in which case elements 8 would not be required. This alternative is considered less desirable than the design shown in the drawings.

The cylindrical portion of the electrode functions (1) to hold the centre line of the shield on the centre line of the electrode, (2) to displace part of the spouted water towards the outside of the shield, where it is needed to prevent steam accumulation, and (3) to provide electrical contact area additional to that provided by shield 5.

Figure 1 shows the assembly of a tip-shielded electrode in a water-spout boiler 17. Ground shell 15 divides the boiler into a steam generating compartment and a control compartment in accordance with U.S. Patent 2,729,738 but the electrode of this invention is not restricted to use in boilers constructed in this way. Water is discharged from water-spout 1 through the holes in a suitable nozzle 2, a plan of which is shown in Figure 6. The jets of pumped water with additional water entrained from the surrounding boiler water form a rising column of water which on contact with the electrode is divided so that the inner portion passes through the space between the electrode tip and the shield and the outer portion is displaced towards the outside of the shield where it reduces or prevents the accumulation of steam thereon.

The rate of flow through the water-spout nozzle 2 must be sufficient to carry spouted water not only through the annular space between electrode tip and shield but also around the outside of the shield; it must be at least equal to the full-load rate of evaporation of the boiler. With the electrode design specified above it is found in practice that the spouted water does not cause boiler water oscillations, and other operating difficulties common to electrodes of conventional designs do not occur.

In Figure 1, ZZ is the automatically controlled water level in the boiler control compartment, water level XX indicates operating conditions when the water level on the electrodes is above the shields. It is found that at any water level on an electrode the water level rises higher at the surface of the electrode than the normal level, thus indicating that the spouted water is being forced upwards along the electrode surface. As the water level falls below an electrode, as shown at level YY, a mound of spouted water maintains contact with the electrode, thus producing a voltage gradient such that the possibility of a flash-over is eliminated.

The various advantages of the method and apparatus disclosed will be apparent to those skilled in the art.

It will also be understood that various modifications may be made in the specific embodiments disclosed without departing from the spirit of the invention or the scope of the following claims.

What is claimed is:

1. In an electric boiler of the type having at least one electrode normally partially submerged in the boiler water and pumping means for taking water from the boiler and spouting the said water up to and around the lower end of the electrode, an apparatus comprising a cylindrical metal electrode having a tapered tip, the tip being surrounded by a metal shield at a distance to provide an annular space between tip and shield, the shield being mechanically and electrically connected to the tip.

2. An apparatus according to claim 1 wherein the mechanical and electrical connections are made with welded metal strips.

3. An apparatus according to claim 1 wherein the tapered tip of the electrode consists of a conical portion and a removable cylindrical portion with a rounded end, the shield being mechanically and electrically connected to the cylindrical portion by at least two radial metal strips and to the conical portion by at least two radial metal strips positioned so as to be accessible to a cutting torch.

4. An apparatus according to claim 1 wherein the radial width of the annular space between the shield and the tip is between one-half and one inch.

5. An apparatus according to claim 3 wherein the radial width of the annular space between the tip and the shield is between one-half and one inch, the mechanical and electrical connections between the tip and the shield are made by welding, the outer surface of the shield consists of a hemispherical lower end surmounted by a cylindrical portion the radius of both being about equal to the radius of the electrode, the lower end of the shield has a central opening for the electrode tip and the annular space between the tip and the shield, and the shield is located so that the imaginary extension of its lower surface coincides with the lower end of the electrode tip.

6. An apparatus according to claim 3 wherein the diameter of the cylindrical metal electrode is greater than nine inches, the radial width of the annular space between the tip and the shield is between one-half and one inch, the mechanical and electrical connections between the tip and the shield are made by welding, the total height of the shield is roughly equal to the diameter of the electrode, the outer surface of the shield consists of a hemispherical end the radius of which is between 50 and 90% of the radius of the electrode and an upper portion tapered outwards from the hemispherical end to the radius of the electrode at the upper end of the shield, the spherical lower end of the shield has a central opening for the electrode tip and the annular space between the tip and the shield, and the shield is located to that the imaginary extension of its lower surface coincides with the lower end of the electrode tip.

7. An apparatus according to claim 3 wherein the diameter of the cylindrical metal electrode is less than seven inches, the radial width of the annular space between the tip and the shield is between one-half and one inch, the mechanical and electrical connections between the tip and the shield are made by welding, the total height of the shield is roughly equal to the diameter of the electrode, the outer surface of the shield consists of a hemispherical end the radius of which is between 10 and 50% greater than the radius of the electrode and an upper portion tapered inwards from the hemispherical end to the radius of the electrode at the upper end of the shield, the spherical lower end of the shield has a central opening for the electrode tip and the annular space between the tip and the shield, and the shield is located so that the imaginary extension of its hemispherical lower surface coincides with the lower end of the electrode tip.

References Cited in the file of this patent

UNITED STATES PATENTS

| | | |
|---|---|---|
| 2,605,381 | Head | July 29, 1952 |
| 2,611,852 | Eaton | Sept. 23, 1952 |
| 2,676,240 | Eaton | Apr. 20, 1954 |
| 2,783,356 | Eaton | Feb. 26, 1957 |